June 18, 1957 G. BERGONZO 2,796,298
LOCKING DEVICE FOR VEHICLE WHEELS
Filed Sept. 30, 1954 3 Sheets-Sheet 2
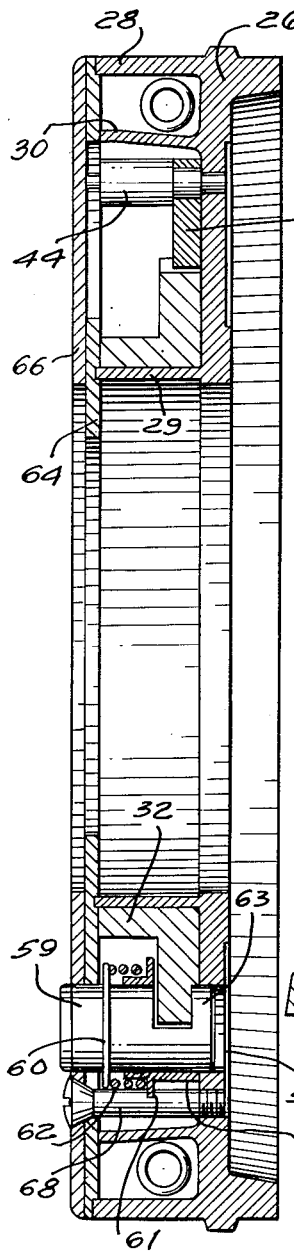
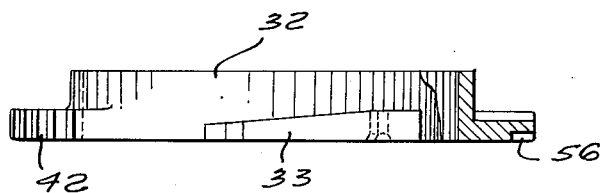
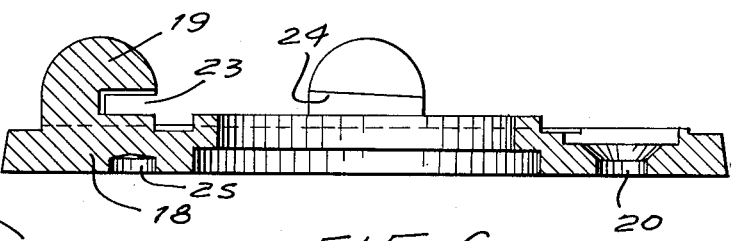
INVENTOR.
Giovanni Bergonzo
BY
Michael S. Striker
agt.

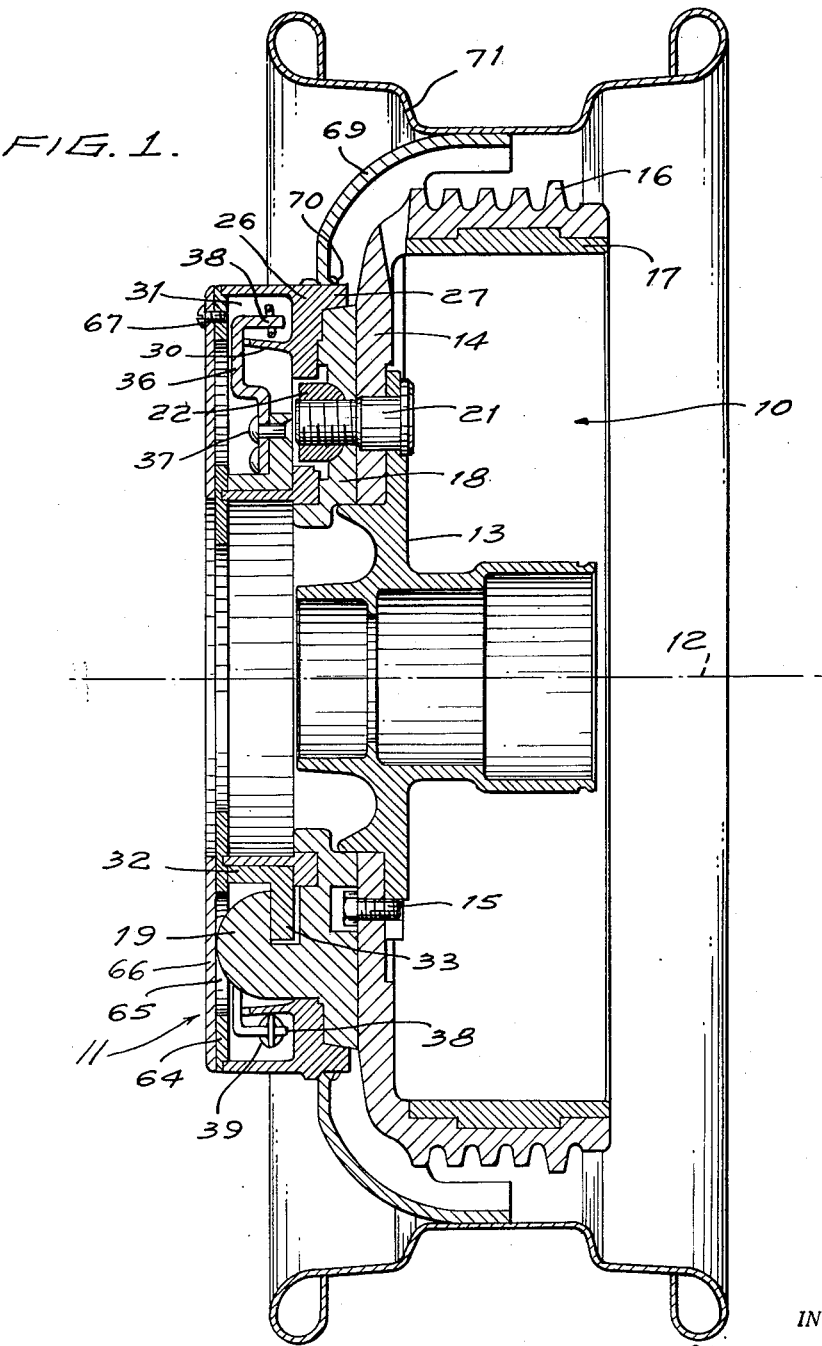

June 18, 1957  G. BERGONZO  2,796,298
LOCKING DEVICE FOR VEHICLE WHEELS
Filed Sept. 30, 1954  3 Sheets-Sheet 3

INVENTOR.
Giovanni Bergonzo
BY
Michael S. Striker
agt.

United States Patent Office 2,796,298
Patented June 18, 1957

2,796,298

LOCKING DEVICE FOR VEHICLE WHEELS

Giovanni Bergonzo, Turin, Italy, assignor to Societe d'Etudes et de Brevets, S. A., Tangier, Morocco Application September 30, 1954, Serial No. 459,263

Claims priority, application Italy January 26, 1954

8 Claims. (Cl. 301—9)

The present invention relates to attaching arrangements, particularly for vehicle wheels.

With conventional vehicle wheels a great deal of time and trouble is required to remove and replace a vehicle wheel as when a tire is changed. Although there are some known devices for reducing the inconvenience involved in removing and remounting a vehicle wheel, up to the present time all of these devices either operate unsatisfactorily or are exceedingly complicated and unreliable in operation.

One of the objects of the present invention is to provide an arrangement for very quickly and easily removing and remounting an article on a support.

Another object of the present invention is to provide a quickly and easily removable and remountable vehicle wheel which is made up of simple and ruggedly constructed parts which are very reliable in operation.

A further object of the present invention is to provide such a vehicle wheel with a safety device which prevents injury to the operator during handling of the vehicle wheel.

An additional object of the present invention is to provide a vehicle wheel which requires a very small amount of force to be exerted by the operator when removing and remounting the vehicle wheel.

Also, it is an object of the present invention to provide a vehicle wheel which consists of only two main units, one of which remains fixed to the vehicle while the other is removable from and easily assembled with the unit fixed to the vehicle.

With the above objects in view the present invention mainly consists of a vehicle wheel which includes a hub unit adapted to remain fixed to the vehicle. This hub unit has a front annular face located about the axis of rotation of the wheel, and a plurality of holding members are fixed to and extend forwardly from this front face of the hub unit, the holding members being distributed about the axis of rotation and each being formed with a wedge-shaped notch. A removable wheel-carrying unit includes a supporting ring which engages the front face of the hub unit and which is formed with openings through which the holding members respectively extend. An annular member is turnable on the supporting ring and carries a plurality of wedge members which respectively extend into the notches of the holding members into wedging engagement with the latter for connecting the wheel-carrying unit to the hub unit. A spring means on the supporting ring urges the annular member in that direction which moves the wedge members into the notches. A pinion and gear sector are provided to turn the annular member in that direction which moves the wedge members out of the notches and to simultaneously tension the spring means and a catch member maintains the spring means tensioned while the wheel-carrying unit is removed from the hub unit after the wedge members are located out of the notches. When the wheel-carrying unit is replaced, it is only necessary to release the catch and the spring means turns the annular member so as to move the wedge members into the notches of the holding members. Furthermore, a safety catch is provided to prevent release of the spring means while the wheel-carrying unit is away from the hub unit.

The novel features which are considered as characteristic for the invention are set forth in particular in the appended claims. The invention itself, however, both as to its construction and its method of operation, together with additional objects and advantage thereof, will be best understood from the following description of specific embodiments when read in connection with the accompanying drawings, in which:

Fig. 1 is a sectional, elevational view of a vehicle wheel constructed in accordance with the present invention, Fig. 1 being taken along the line 1—1 of Fig. 3 in the direction of the arrows and showing additional wheel structure which is omitted from Fig. 3;

Fig. 2 is a sectional, elevational view of a part of the wheel-carrying unit of the invention and is taken along the line 2—2 of Fig. 3 in the direction of the arrows;

Fig. 5 is a partly sectional, elevational view of an annular wedge carrying member of the invention, this member being shown in Fig. 5 as seen from its outer periphery; and Fig. 6 is a sectional view also taken along the line 1—1 of Fig. 3 in the direction of the arrows and showing only the front part of the hub unit and the holding members carried thereby.

Figure 3:
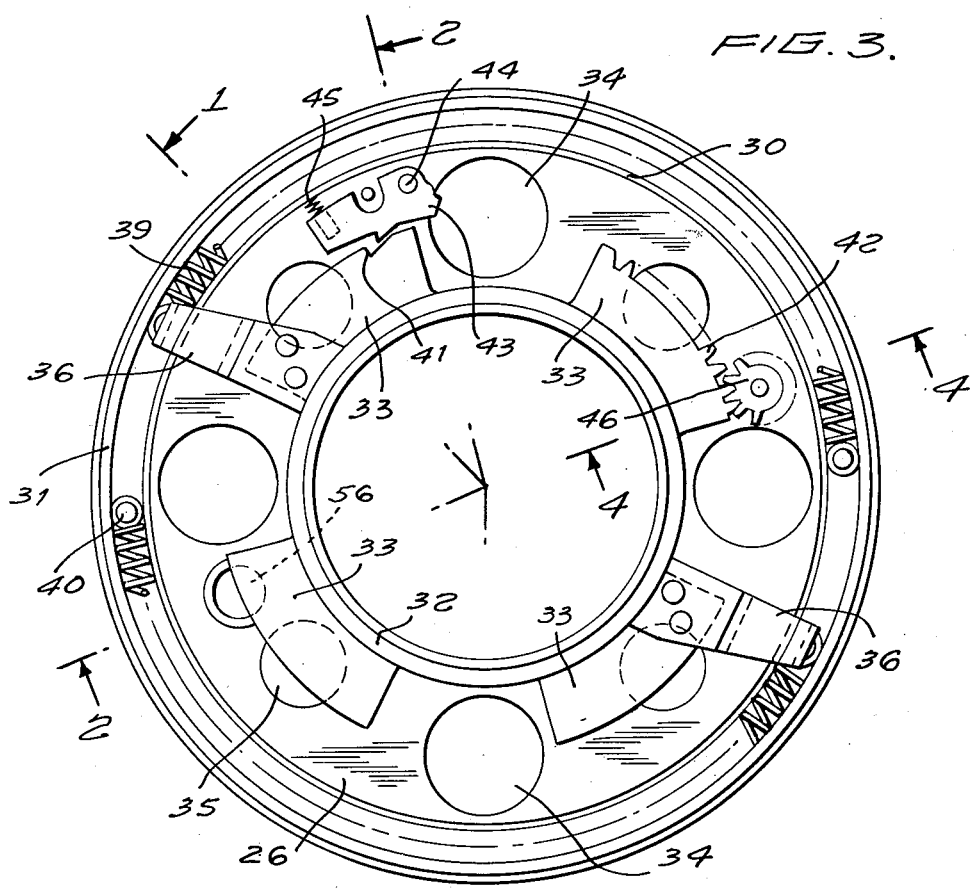
Fig. 3 shows the structure of Fig. 2 as seen from the left side thereof with the cover plates of Fig. 2 removed to clearly illustrate the structure therebeneath.

Referring now to the drawings, and in particular to Fig. 1, it will be seen that the structure of the invention includes a hub unit 10 and a wheel-carrying unit 11. The hub unit 10 is of an annular construction and is located about the axis of rotation 12 of the wheel. The hub unit 10 includes a central hub 13 adapted to be carried by the axle of the vehicle. The hub 13 carries the annular brake drum 14 which is fixed to the hub 13 in any suitable manner as by the screw members 15. The brake drum 14 includes such conventional features as the outer annular cooling fins 16 and the inner brake lining 17.

The structure of the invention includes the annulus 18 which has the holding members 19 fixed thereto as by being formed integrally therewith, this annulus being shown most clearly in Fig. 6. The annulus 18 is provided with openings 20 through which bolts 21 extend, these bolts 21 being engaged by nuts 22, respectively, for fixing the annulus 18 on the brake drum 14. The front face of the annulus 18 forms the front annular face portion of the hub unit 10, and the holding members 19 extend forwardly from this front face.

The holding members 19 are uniformly distributed about the axis of rotation 12, and in the particular example illustrated there are four holding members 19, although three holding members 19 will suffice. Each holding member 19 has a spherical front end, as shown in the drawings. Furthermore, each holding member 19 is formed with a notch 23. As is particularly apparent from Fig. 6, these notches 23 are of wedge-shaped cross section, the side surface of each notch 23 adjacent the brake drum 14 being flat and in a plane normal to axis 12 while the opposite side surface 24 of each notch 23 is inclined to the other side face of the notch to give each notch a wedge-shaped cross section. The notches progress in the same direction from their larger to their smaller ends. It will be noted that the annulus 18 is formed with recesses 25 in which the heads of bolts 15 are respectively located.

The above described structure forms the hub unit of the invention which remains fixed to the vehicle. This hub unit has removably connected thereto wheel-carrying unit 11 now to be described. The wheel-carrying unit 11 includes a supporting ring 26 which engages the front face of the annulus 18, this ring 26 being located about the axis 12. It will be noted that the ring 26 has a rearwardly extending flange 27 with an inner conical side surface which is in mating engagement with a conical outer side surface of the annulus 18. Furthermore, the ring 26 is formed with a plurality of openings through which the holding members 19 respectively extend, as shown in Fig. 1, and furthermore, the ring 26 is formed with openings into which the nuts 22 extend. It will be noted that the ring 26 extends beyond the notches 23 toward the hub unit 10 so that this ring 26 is located at least in part between these notches and the front face of the annulus 18.

The ring 26, the details of which are illustrated in Figs. 2 and 3 as well as Fig. 1, includes an outer forwardly extending annular flange 28 as well as an inner forwardly extending annular flange 29. An intermediate annular flange 30 also extends forwardly from the front face of ring 26 and is located between the flanges 28 and 29 and adjacent the flange 28 to form an annular channel 31 therewith for a purpose described below. It will be noted that the flanges 28 and 29 extend forwardly beyond the intermediate flange 30.

An annular member 32 is turnably carried by the supporting ring 26, the details of this annular member being shown in Fig. 5 as well as in Figs. 1–3. The annular member 32 has an annular side surface engaging the outer side surface of flange 29 to be turnably guided thereby, and furthermore the annular member 32 slidably engages the front face of the ring 26. The annular member 32 has fixed thereto a plurality of wedge members 33, shown most clearly in Fig. 5, and being equal in number to the number of holding members 19. The wedge members 33 respectively extend into the notches 23 into wedging engagement with the holding members 19 for releasably maintaining wheel-carrying unit 11 on the hub unit 10.

As is apparent from Fig. 3, which shows the openings 34 of ring 26 through which the holding members 19 extend as well as the openings 35 of this ring to accommodate the nuts 22, a pair of hook members 36 are fixed to a pair of opposite wedge members 33 and extend substantially radially therefrom toward the intermediate flange 30. As is most clearly shown in Fig. 1, the hook members 36 are bent over the flange 30 and extend into the channel 31, the outer edge of the flange 30 being indented through an angular distance sufficient to provide the required amount of free turning movement of the hook members 36 which are fixed to the annular member 32 by any suitable means such as the rivets 37. These hook members 36 each have a hook end 38 located in the channel 31.

Figure 4:
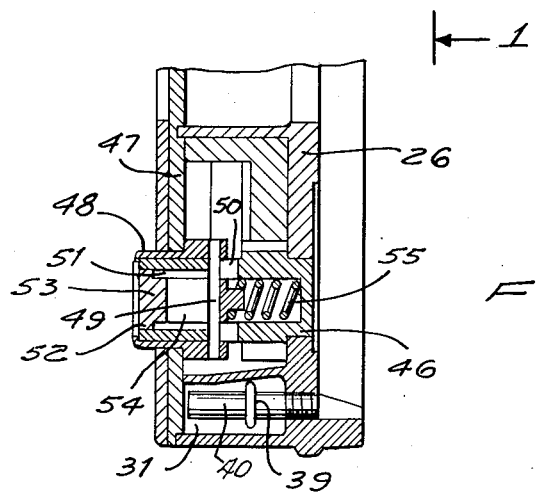
Fig. 4 is a fragmentary, sectional view taken along the line 4—4 of Fig. 3 in the direction of the arrows and showing the details of the manually turnable means for releasing the wheel-carrying unit from the hub unit.

A pair of springs 39 are respectively connected to the hook ends 38 of hook members 36 and extend along the channel 31 to the pins 40 to which the opposite ends of the springs 39 are respectively connected, one of the pins 40 being shown in Fig. 4. Thus, the springs 39 are guided in the channel 31, and in particular by the outer face of the intermediate flange 30, and it will be noted that this arrangement locates the springs 39 at a considerable distance from the axis of rotation 12 so that the force of the springs is applied to the annular member 32 through a substantial moment arm which enables the springs to have a relatively small size while exerting a relatively large force.

As is apparent from Fig. 3, one of the wedge members 33 is formed with a pawl tooth 41 while an adjacent wedge member 33 is formed with gear teeth 42. A pawl member 43 is pivotally carried by the ring 26 through the medium of a pivot pin 44 (Figs. 2 and 3), and a spring 45 engages the inner face of flange 30 and the pawl 43 to urge the latter in a counterclockwise direction about pivot 44, as viewed in Fig. 3, so as to urge the tooth of pawl 43 into engagement with the tooth 41 to prevent further turning movement of the annular member 32.

A pinion 46 is turnably carried by the ring 26 and meshes with the gear sector 42 forming part of the upper right wedge member 33 of Fig. 3. The details of the pinion 46 are shown in Fig. 4 from where it may be seen that the pinion 46 is in fact a tubular member turnable in an opening of the ring 26 and held against the latter by the cover plate 47 to be described below. The teeth of pinion 46 are integral with and extend from the outer surface of the tubular portion thereof. The tubular portion of pinion 46 extends into the tubular member 48 provided with a shoulder engaged by cover 47 and having a pin 49 fixed to and extending across the interior thereof. This pin 49 extends through a pair of opposite openings 50 in the tubular portion of pinion 46. The inner surface of the tubular portion 46 is formed to the left of pin 49, as viewed in Fig. 4, with spline grooves 51 in which extend teeth 52 at the outer periphery of member 53. This member 53 is elongated and is formed with a slot 54 extending completely through the shank of member 53, and it will be noted that the pin 49 also extends through the slot 54. A spring 55 in the tubular portion of opening 46 engages member 53 to urge the latter to the left to the position shown in Fig. 4 against the pin 49.

The inner face of annular member 32 located directly next to the front face of ring 26 is formed at the lower left wedge member 33 of Fig. 3, with a detent recess 56. A tube 57 (Fig. 2) is fixed to and extends forwardly from the front face of the ring 26 and is aligned with an opening 58 formed in the ring 26. A catch pin 59 is slidable within the tube 57 and opening 58, and this catch pin has an annular flange 60 integral therewith or formed by a separate collar fixed thereto. The tube 57 is also formed with a flange 61 integral therewith or in the form of a collar fixed thereto, and it will be noted that the tube 57 as well as catch pin 59 are formed with cutouts to provide a free path of movement for the lower left wedge member 33 of Fig. 3. A spring 62 is located between the flanges 60 and 61 to urge the catch pin 59 to the left, as viewed in Fig. 2, so that when the annular member 32 is turned so as to locate the recess 56 opposite pin 59, the spring 62 will urge the portion 63 (Fig. 2) of pin 59 into the detent recess 56 for a purpose described below. This latter position of the parts is shown in Figs. 2 and 3.

In addition to the above-described structure, the wheel-carrying unit 11 is provided with an inner cover plate 64 which is formed with openings 65 to accommodate the outer ends of holding members 19, and an outer annular cover member 66 is located against cover member 64 and covers the openings 65 thereof. This arrangement prevents dust from getting into the interior of the mechanism carried by the ring 26. Fig. 1 shows one of a plurality of screw members 67 which interconnect the cover members 64 and 66, while Fig. 2 shows one of a plurality of screw members 68 which interconnect both cover members with the ring 26 and which urge the cover members against the outer edges of flanges 28—30, the flange 30 being provided with indented portions at its outer edge, as described above and shown clearly in Fig. 1, to provide free turning movement of hook members 36 through the desired angle.

It will be noted from Fig. 1, that the ring 26 has an annulus 69 fixed thereto as by a weldment 70, and this annulus 69 has a tire carrying ring 71 fixed thereto.

The above-described structure operates as follows:

The wheel-carrying unit 11 is shown in Fig. 1 operatively connected to the hub unit 10. In this position of the parts, the springs 39 constantly urge the wedge members 33 through the hook members 36 into the notches 23 and maintain the wedge members in wedging engagement with holding members 19 so that the wheel-carrying unit 11 is securely connected to the hub unit 10.

Assume now that for some reason it is desired to remove the wheel-carrying unit 11. To accomplish this the operator uses a crank having at one end teeth which fit into the spline grooves 51 (Fig. 4) formed in the interior of the tubular pinion 46. The operator merely inserts the crank against the plate 53 which moves to the right, as viewed in Fig. 4, to compress the spring 55 so that the teeth of the crank become located in the spline grooves 51, and thus the crank is in driving engagement with the pinion 46. The member 53 prevents dust from entering into the interior of the mechanism carried by ring 26, and the operator simply holds this member 53 in against the action of spring 55 when the crank is in driving engagement with the pinion 46.

Then the operator turns the pinion 46 in that direction which turns the annular member 32 so as to move the wedge members 33 out of notches 23, respectively, and so as to tension the springs 39. It will be noted that the pinion 46 and gear sector 42 provide a considerable mechanical advantage so that the operator need not exert a great force. The operator continues this turning of the pinion 46 and tensioning of the springs 39 until the mechanism carried by ring 26 is located in the position shown in Fig. 3. The operator will know when this position is reached because at this moment the pin 59 clicks at the portion 63 thereof into substantially semi-circular detent recess 56. Thus, the pin 59 prevents the ring 32 from turning in a clockwise direction, as viewed in Fig. 3, under the action of springs 39 and the operator may now remove the crank.

It will be noted that at this time, that is, while the wheel-carrying unit 11 is still on the hub unit 10, the pawl 43 is in engagement with the holding member 19 which extends through the upper opening 34 of Fig. 3, and in this position the pawl 43 is held by this member 19 against the action of spring 45 out of the path of movement of the pawl tooth 41. Now the operator may remove the wheel-carrying unit 11 simply by moving the ring 26 and all parts carried thereby forwardly from the pins 65. As soon as the wheel-carrying unit 11 is removed sufficiently, the spring 45 urges the pawl 43 to the position shown in Fig. 3 where the right end of the pawl 43 overlaps the upper opening 34 of ring 26 shown in Fig. 3. Now the operator may set the wheel-carrying unit 11 down and perform whatever operations are required. If at any time the pin 59 is accidentally depressed so as to move the portion 63 thereof out of the detent recess 56, the springs 39 will only be able to turn the annular member 32 through a short distance until the tooth 41 engages the pawl 43. Thus, the pawl 43 and tooth 41 provide a safety mechanism which prevents release of the springs 39 by accident.

When it is desired to replace the wheel-carrying unit 11 on the hub unit 10, the unit 11 is simply moved onto the hub unit 10 and the openings 34 are aligned with the holding members 19 and passed over these holding members 19. The holding member 19 which happens to pass through the upper opening 34 of Fig. 3 will engage the pawl 43 to turn the latter in a clockwise direction about pin 44, as viewed in Fig. 3, so as to move the pawl 43 out of the path of the pawl tooth 41. It will be noted that the spherical front end faces of the holding members 19 provide a smooth engagement between whichever holding memebr 19 is located in the upper opening 34 of Fig. 3 and the pawl member 43. The operator moves the wheel-carrying unit 11 onto the holding members 19 until the annular face of ring 26 is located against the front face of hub unit 10, that is, against the front face of annulus 18 in the position shown in Fig. 1. With the parts in this position, the operator merely depresses the pin 59 against the action of spring 62 so as to move portion 63 of pin 59 out of the detent recess 56. In this way the annular member 32 is released to the influence of the springs 39 which were tensioned before the wheel-carrying unit 11 was removed, and this depression of pin 59 causes the springs 39 to suddenly and forcefully turn the annular member 32 in a clockwise direction, as viewed in Fig. 3, so as to quickly and forcefully move the wedge members 33 into the notches 23, respectively, and into wedging engagement with the holding members 19 so that in this way the wheel-carrying unit 11 is quickly and easily connected in a completely secure manner to the hub unit 10.

It will be understood that each of the elements described above, or two or more together, may also find a useful application in other types of vehicle wheels differing from the types described above.

While the invention has been illustrated and described as embodied in removable vehicle wheels, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A vehicle wheel comprising, in combination, a hub unit having a predetermined axis of rotation and an annular front face portion located about said axis; a plurality of holding members distributed about said axis and being fixed to and extending forwardly from said front face of said hub unit, each holding member being formed with a notch having side faces which approach each other so that the width of the notch gradually diminishes along the notch; a support ring located against said front face of said hub unit about said axis thereof; an annular member turnably carried by said support ring for movement about said axis; a plurality of wedges fixed to and carried by said annular member for turning movement therewith, said wedges being respectively located opposite said notches for movement into the same into wedging engagement with said holding members when said annular member turns in one direction and out of engagement with said holding members when said annular members turn in an opposite direction; spring means carried by said support ring and operatively connected to said annular member for urging said wedges into wedging engagement with said holding members to cooperate with the latter to hold said support ring on said hub unit; turning means on said support ring operatively engaging said annular member for turning the latter in said opposite direction against the action of said spring means to tension the latter and move said wedges out of engagement with said holding members, whereby said support ring may then be removed from said hub unit so that a tire or the like carried by said support ring may be removed therewith from said hub unit; manually releasable catch means on said support ring operatively engaging said annular member for holding said spring means under tension when said support ring is removed from said hub unit; and safety catch means for preventing full release of said tensioned spring means when said support ring is away from said hub unit, in the event that said manually releasable catch means is accidentally released.

2. In a vehicle wheel, in combination, a wheel-carrying unit including an annular support ring having a front face, inner and outer side flanges extending forwardly from said front face respectively adjacent the inner and outer peripheries of said ring, and an intermediate flange extending forwardly from said front face of said ring and located adjacent said outer flange to form an annular channel therewith; an annular member located against said front face of said ring and having an inner side face engaging the outer side surface of said inner flange to be turnably guided thereby; a plurality of wedges distributed about and fixed to said annular member for turning movement therewith; a hook fixed to said annular member for turning movement therewith and having a hook end located in said channel; and a spring also located in said channel, connected at one end to said support ring, and connected at an opposite end to said hook end of said hook.

3. In a vehicle wheel, in combination, a wheel-carrying unit including an annular support ring having a front face, inner and outer side flanges extending forwardly from said front face respectively adjacent the inner and outer peripheries of said ring, and an intermediate flange extending forwardly from said front face of said ring and located adjacent said outer flange to form an annular channel therewith; an annular member located against said front face of said ring and having an inner side face engaging the outer side surface of said inner flange to be turnably guided thereby; a plurality of wedges distributed about and fixed to said annular member for turning movement therewith; a hook fixed to said annular member for turning movement therewith and having a hook end located in said channel; a spring also located in said channel, connected at one end to said support ring, and connected at an opposite end to said hook end of said hook; a gear sector fixed to said annular member; and a pinion turnably carried by said ring and meshing with said gear sector so that said pinion may be turned to turn said annular member and tension said spring.

4. In a vehicle wheel, in combination, a wheel-carrying unit including an annular support ring having a front face, inner and outer side flanges extending forwardly from said front face respectively adjacent the inner and outer peripheries of said ring, and an intermediate flange extending forwardly from said front face of said ring and located adjacent said outer flange to form an annular channel therewith, and annular member located against said front face of said ring and having an inner side face engaging the outer side surface of said inner flange to be turnably guided thereby; a plurality of wedges distributed about and fixed to said annular member for turning movement therewith; a hook fixed to said annular member for turning movement therewith and having a hook end located in said channel; a spring also located in said channel, connected at one end to said support ring, and connected at an opposite end to said hook end of said hook; a gear sector fixed to said annular member; a pinion turnably carried by said ring and meshing with said gear sector so that said pinion may be turned to turn said annular member and tension said spring; a detent portion on said annular member formed with a recess in a side face of said annular member; a pin movably carried by said support ring for movement toward and away from said side face of said annular member; and a spring operatively connected to said pin for urging the latter into said recess of said detent portion of said annular member when the latter has been turned to tension said first-mentioned spring sufficiently to locate said detent recess opposite said pin.

5. In a vehicle wheel, in combination, a wheel-carrying unit including an annular support ring having a front face, inner and outer side flanges extending forwardly from said front face respectively adjacent the inner and outer peripheries of said ring, and an intermediate flange extending forwardly from said front face of said ring and located adjacent said outer flange to form an annular channel therewith; an annular member located against said front face of said ring and having an inner side face engaging the outer side surface of said inner flange to be turnably guided thereby; a plurality of wedges distributed about and fixed to said annular member for turning movement therewith; a hook fixed to said annular member for turning movement therewith and having a hook end located in said channel; a spring also located in said channel, connected at one end to said support ring, and connected at an opposite end to said hook end of said hook; a gear sector fixed to said annular member; a pinion turnably carried by said ring and meshing with said gear sector so that said pinion may be turned to turn said annular member and tension said spring; a detent portion on said annular member formed with a recess in a side face of said annular member; a pin movably carried by said support ring for movement toward and away from said side face of said annular member; a spring operatively connected to said pin for urging the latter into said recess of said detent portion of said annular member when the latter has been turned to tension said first-mentioned spring sufficiently to locate said detent recess opposite said pin; a pawl tooth formed in the periphery of said annular member; and a pawl turnably located on said support ring opposite said pawl tooth to engage the latter to prevent release of said first-mentioned spring upon accidental release of said pin member from said detent recess.

6. In a vehicle wheel, in combination, a hub unit having a front face; a holding member fixed to and projecting forwardly from said front face and being formed with a wedge-shaped notch; a support ring located against said front face of said hub unit and formed with an opening through which said holding member extends, said ring being extended beyond said notch toward said front face of said hub unit; an annular member turnably mounted on said ring and formed in its periphery with a pawl tooth; a pawl turnably mounted on said ring and engaging said holding member to be held thereby out of the path of movement of said pawl tooth during turning of said annular member; a first spring engaging said pawl for urging the latter toward said annular member and pawl tooth; a wedge carried by said annular member and located opposite said notch for movement into the latter, upon turning of said annular member in one direction, to become wedged to said holding member for connecting said supporting ring to said hub unit; a second spring carried by said ring and connected to said annular member for urging said wedge into said notch; means for turning said annular member to tension said second spring and locate said wedge out of said notch, said pawl being located opposite said pawl tooth when said wedge is out of said notch so that when said ring is removed from said hub unit said pawl is moved away from said holding member to be urged by said first spring toward said pawl tooth; and manual release means on said ring engaging said annular member for maintaining said second spring tensioned, whereby if said manual release means is accidentally released while said ring is away from said hub unit said pawl and pawl tooth will prevent release of said second spring.

7. A vehicle wheel comprising, in combination, a hub unit having an annular front face located about the axis of rotation of the wheel; a plurality of holding members fixed to and extending forwardly from said front face of said hub unit, said holding members being distributed uniformly about said axis, having spherical front ends and each being formed with a wedge-shaped notch; a support ring located on said hub unit against said front face thereof, said ring having an inner annular flange extending forwardly from the inner periphery thereof, an outer annular flange extending forwardly from the outer periphery thereof, and an intermediate annular flange located between said inner and outer flanges, extending forwardly from the front face of said ring, and located adjacent said outer flange to form an annular channel therewith, said ring being formed with a plurality of openings through which said holding members respectively extend and said ring extending beyond said notches toward said front face of said hub unit; an annular member turnably mounted on said ring and engaging said inner flange thereof to be guided thereby; a plurality of wedges fixed to said annular member for turning movement therewith and being respectively located in said notches in wedging engagement with said holding members to maintain said ring on said hub unit until said annular member is turned to move said wedges out of said notches; a pair of diametrically opposed hooks fixed to said annular member, extending substantially radially therefrom, and each having a hook end located in said channel; a pair of springs respectively located in said channel, each connected at one end to said ring, and being respectively connected to said hook ends of said hooks for urging said wedges into said notches; gear teeth formed in the periphery of one of said wedges; and a pinion turnably mounted on said ring and meshing with said gear teeth.

8. An attaching arrangement comprising, in combination, a support unit having a front face portion located about a predetermined axis; a plurality of holding members distributed about said axis and being fixed to and extending forwardly from said front face of said support unit, each holding member being formed with a notch having side faces which approach each other so that the width of the notch gradually diminishes along the notch; a support ring located against said front face portion of said support unit about said axis thereof; an annular member turnably carried by said ring for movement about said axis; a plurality of wedges fixed to and carried by said annular member for turning movement therewith, said wedges being respectively located opposite said notches for movement into the same into wedging engagement with said holding members when said annular member turns in one direction and out of engagement with said holding members when said annular members turn in an opposite direction; spring means carried by said support ring and operatively connected to said annular member for urging said wedges into wedging engagement with said holding members to cooperate with the latter to hold said support ring on said hub unit; turning means on said support ring operatively engaging said annular member for turning the latter in said opposite direction against the action of said spring means to tension the latter and move said wedges out of engagement with said holding members, whereby said support ring may then be removed from said support unit so that an article carried by said support ring may be removed therewith from said support unit; manually releasable catch means on said support ring operatively engaging said annular member for holding said spring means under tension when said support ring is removed from said support unit; and safety catch means for preventing full release of said tensioned spring means when said support ring is away from said support unit in the event that said manually releasable catch means is accidentally released.

References Cited in the file of this patent
UNITED STATES PATENTS

| 2,568,370 | Scuderi | Sept. 18, 1951 |
| 2,597,433 | Bergonzo | May 20, 1952 |